(12) United States Patent
Obeso et al.

(10) Patent No.: US 11,168,488 B2
(45) Date of Patent: Nov. 9, 2021

(54) MECHANICALLY ACTIVATED CEMENTITIOUS COMPOSITE FOR STOPPING THE IMPACT OF FIREARMS

(71) Applicants: Orlando Gutierrez Obeso, Miguel Hidalgo (MX); Sebastian Diaz de la Torre, Naucalpan (MX)

(72) Inventors: Orlando Gutierrez Obeso, Miguel Hidalgo (MX); Sebastian Diaz de la Torre, Naucalpan (MX)

( * ) Notice: Subject to any disclaimer, the term of this patent is extended or adjusted under 35 U.S.C. 154(b) by 0 days.

(21) Appl. No.: 16/621,636

(22) PCT Filed: Jun. 18, 2018

(86) PCT No.: PCT/MX2018/050014
§ 371 (c)(1),
(2) Date: Dec. 11, 2019

(87) PCT Pub. No.: WO2018/231044
PCT Pub. Date: Dec. 20, 2018

(65) Prior Publication Data
US 2020/0208428 A1 Jul. 2, 2020

(30) Foreign Application Priority Data

Jun. 16, 2017 (MX) .................... MX/a/2017/007995

(51) Int. Cl.
| | | |
|---|---|---|
| *E04H 9/04* | (2006.01) | |
| *C04B 14/48* | (2006.01) | |
| *C04B 28/04* | (2006.01) | |
| *C04B 28/06* | (2006.01) | |

(52) U.S. Cl.
CPC ............... *E04H 9/04* (2013.01); *C04B 14/48* (2013.01); *C04B 28/04* (2013.01); *C04B 28/06* (2013.01)

(58) Field of Classification Search
CPC ......... C04B 14/48; C04B 28/04; C04B 28/06; E04H 9/04
See application file for complete search history.

(56) References Cited

U.S. PATENT DOCUMENTS

| | | | |
|---|---|---|---|
| 6,264,735 B1 * | 7/2001 | Bean | C04B 22/16 106/644 |
| 7,867,432 B2 * | 1/2011 | Hargrove | B28B 1/525 264/426 |
| 8,062,741 B2 * | 11/2011 | Tonyan | B32B 7/08 428/294.7 |
| 9,034,097 B2 * | 5/2015 | Wu | C04B 28/021 106/698 |
| 9,121,675 B1 * | 9/2015 | Amidon | C04B 28/04 |
| 2017/0234659 A1 * | 8/2017 | Amidon | C04B 28/04 273/410 |

FOREIGN PATENT DOCUMENTS

WO WO-2007029995 A1 * 3/2007 ........... C04B 28/065

* cited by examiner

*Primary Examiner* — Anthony J Green
(74) *Attorney, Agent, or Firm* — James R. McDaniel

(57) ABSTRACT

The present invention refers to a mechanically activated cementitious composite for stopping the impact of firearms, which involved the designing of mixes of Portland Composite Cement PCC mechanically activated through high energy mechanical milling (HEM) with other ingredients, such as: Ordinary PCC Cement, fine sand, fibers, and polymeric additives, among other compounds, to prepare high-performance composite walls capable of stopping several calibers up to type 50 (typically loaded in Barret rifles). In accordance with Mexican and U.S. Standards for ballistic tests, which entail the approval of the concrete ballistic-resistant wall as long as it resists one impact with a 50 caliber Barret, the present invention allows the construction of composite walls (with dimensions of 40×40×15 cm) with mechanically activated cement and performance complying with the standards.

2 Claims, 3 Drawing Sheets

MECHANICALLY ACTIVATED CEMENTITIOUS COMPOSITE FOR STOPPING THE IMPACT OF FIREARMS

FIELD OF THE INVENTION

The present invention refers to the application of construction materials resistant to the impact of firearms of several calibers in zones prone to being attacked with firearms. More specifically, the field of application would be in the federal penitentiary system, military facilities, federal and/or state police facilities, bank vaults, schools, security guard facilities, etcetera.

BACKGROUND OF THE INVENTION

Laminated bullet-proof panels, such as those described in U.S. Pat. No. 8,062,741 published on Dec. 22, 2011, are currently available. Said patent is related to a laminated panel with a cementitious core made of a combination of inorganic and organic materials with certain specific properties (ballistic and earthquake-resistant). This combination of materials when mixed with water results in an excellent fluidity and self-leveling in the mixing stage, as well as the development of a very high resistance to compression of at least 10,000, 15,000, or 20,000 psi (703, 1,055, or 1,406 kgf/cm2, respectively) after curing for 28 days.

The design of the material of the panel described in U.S. Pat. No. 8,062,741 is of multiple alternating layers of metal with cementitious panels. This type of panel presents several problems, such as using more than one component of different materials to construct a wall, as well as long manufacturing process times, and are not designed to withstand high-power calibers.

The present invention is intended to solve the previously mentioned difficulties, providing a mechanically activated cementitious composite for stopping the impact of firearms that, once manufactured to be used in walls or roofs, consists of only one piece and does not require other additional elements.

The invention proposed for protection is focused on the area of advanced cements for stopping the impact of firearms and encompasses the inclusion of pozzolanic additives, metallic fibers, and polymers. It is focused on protecting against the following calibers: 0.22, 0.380, 5.56, 7.62×39 mm, 7.62×51 mm (perforating bullets), 12.7×99 mm. (perforating bullets); as well as the use of MKIIIA3 and M26M grenades.

Description of Invention

DETAILED DESCRIPTION OF THE INVENTION

Figure 1:
FIG. 1 shows the front side of a specimen pre-ballistic impact.

In accordance with that shown in the drawings, the present invention refers to a mechanically activated cementitious composite for stopping the impact of firearms with involves the mechanical activation of a Portland Composite Cement (PCC) and/or Ordinary Portland Cement (OPC), as well as the addition of high-expansion pozzolana that promotes the packing of the cement, increasing its resilience.

The Composite of the present invention is intended to achieve a high level of ballistic protection, in this case stopping 12.7×99 mm. caliber warheads with steel cores (perforating bullets). The level of ballistic protection is equivalent and/or superior to level "X" in the UL-752 standard.

The following table summarizes the results obtained with the specimens subjected to the impact of 12.7×99 mm (0.50 Cal.) caliber perforating bullets, according to ballistics application standard UL-752. It is important to mention that the maximum grade of said standard only takes into account ductile projectiles, while those used in the ballistic tests were projectiles with steel cores (tool steel subjected to thermal treatment), thereby exceeding the maximum level of said standard.

| SPECIMEN PCC/HEM | CALIBER | No. OF IMPACTS | STOPPAGE |
|---|---|---|---|
| 1 | 12.7 × 99 mm | 1 | EFFECTIVE |
| 2 | (.50) PERFORATING | 1 | EFFECTIVE |
| 3 | BULLET | 1 | EFFECTIVE |
| 4 | | 1 | EFFECTIVE |
| 5 | | 1 | EFFECTIVE |
| 6 | | 1 | EFFECTIVE |
| 7 | | 1 | EFFECTIVE |
| 8 | | 1 | EFFECTIVE |
| 9 | | 1 | EFFECTIVE |
| 10 | | 1 | EFFECTIVE |

The Composite of the present invention aims to achieve the conversion of a PCC cement into another high-performance concrete (HPC) and the construction of high-performance concrete walls having resistance to compression (80 MPa), super-fast curing (approx. 24 h), and architectural armor.

More specifically, the mechanically activated cementitious composite for stopping the impact of firearms of the present invention comprises:

a. Ordinary Portland Composite Cement PCC in a proportion of 60% to 40% weight proportion;
b. Nanometer PCC Cement in a proportion of 10 to 30%;
c. Steel fibers in a proportion of 1 to 15%;
d. Pozzolanic additives, such as high-expansion densite, in a proportion of 1 to 25%;
e. Aluminum silicate, such as aluminum oxide, in a proportion of 1% to 25%;
f. Chemical additives, such as accelerators and mix fluidifiers, in a proportion of 5% to 10%;

Additionally, a method for preparing a mechanically activated cementitious composite for stopping the impact of firearms is provided, which comprises the following stages:

I. Supply of PCC and/or OPC Concrete, mechanically activated through high energy milling;
II. Addition of high-expansion pozzolana;
III. Addition of water;
IV. Placement in molds 15 cm thick;

V. Natural annealing and curing for 28 days in water with 1% calcium oxide per volume at a temperature of 27° C.

Figure 2:
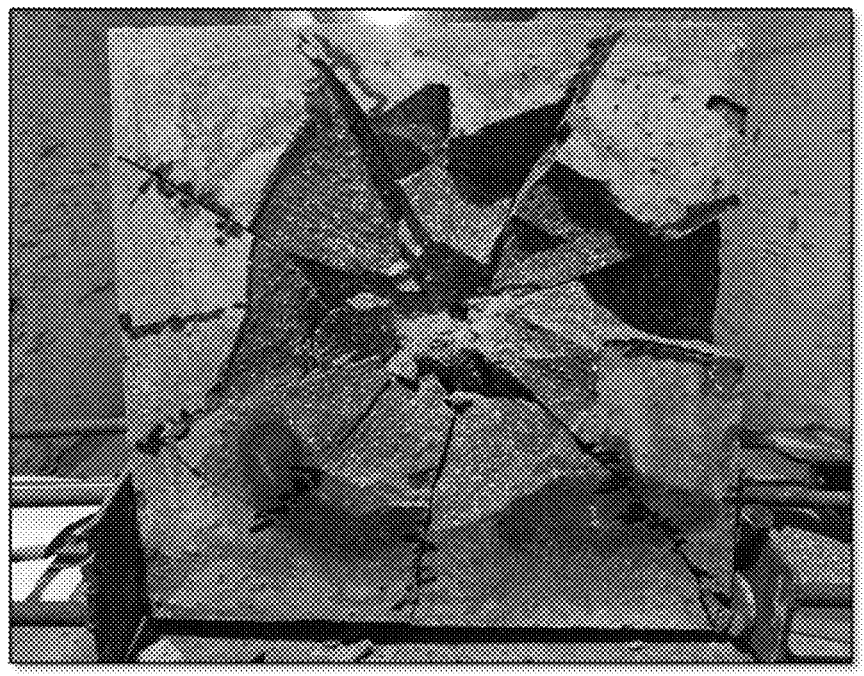
FIG. 2 shows the front side of a specimen post-ballistic impact. The manner in which the kinetic energy of the projectile is dissipated through the observe fracture mechanisms indicates the highly isotropic behavior of the concrete.

In order to corroborate the high-resistance characteristics of the composite of the present invention, physical tests were carried out by firing shots against specimens constructed with the composite, using specimens with the following dimensions: 40 cm on each side and 15 cm thick. These specimens were subjected to impact by 12.7×99 ma caliber perforating bullet firearms. As shown in FIG. 1, a specimen was placed at a distance of 50 meters and, upon shooting, it can be observed that the physical damage to the specimen is minimal, as in FIG. 2, in which the fractures appearing in the material as a result of the impact of the firearm demonstrate the natural isotropic behavior of the composite; see the above table.

For the purposes of comparing the results obtained with our invention with existing prior art, below is an explanation of a ballistic impact resistance test carried out in accordance with Standard UL 752, as per the following table, on panels manufactured with a traditional cementitious composite which were used as blanks, with the following dimensions: 33.0×33.0×7.5 cm, with specimens 7.5 cm thick.

| LEVEL | AMMUNITION | WEIGHT (g) | NUMBER OF SHOTS |
|---|---|---|---|
| 1 | 9 mm F.M.J., lead core | 8.0 | 3 |
| 2 | .357 Magnum, lead core | 10.2 | 3 |
| 3 | .44 Magnum, lead core | 15.6 | 3 |
| 4 | .30, lead core | 11.7 | 1 |
| 5 | 7.62 mm F.M.J., lead core | 9.7 | 1 |
| 6 | 9 mm F.M.J., lead core | 8.0 | 5 |
| 7 | 5.56 mm F.M.J., lead core | 3.56 | 5 |
| 8 | 7.62 F.M.J., lead core | 9.7 | 5 |
| 9 | .30-06 F.M.J., steel core | 10.8 | 1 |
| 10 | .50 F.M.C.J., lead core | 45.9 | 1 |

As a model for the test on the 33.0×33.0×7.5 cm specimen, a 0.223 Remington rifle was used with a 55.1 grain bullet and a speed of 958 m/s, as per Standard UL 752-Level 7. For each panel, at least 3 shots were fired. In all cases, the bullets were stopped, and the depth of penetration of the bullets was measured and found to be from 23 to 26 mm.

As can be observed in the previous table, level 7 corresponds to a 5.56 caliber, typically an m-16 rifle or m-4 carbine. The cementitious composite of the present invention provides protection against this caliber with 7.5 cm. Additionally, the purpose of the present invention is to provide protection against bullets over level 10 of Standard UL 752, for the equivalent of a 15 cm-thick Barret rifle, as the impact is not a Lead Core, but rather a Perforating Bullet or Steel Core, and for an equivalent 7.5 thick, the level of protection would be equivalent to level 8 (7.62×51 mm L.C. Lead Core). That is, with the same thickness, over level 7, as explained in the 33.0×33.0×7.5 cm specimen, which provides superior protection with the same material thickness.

Figure 3:
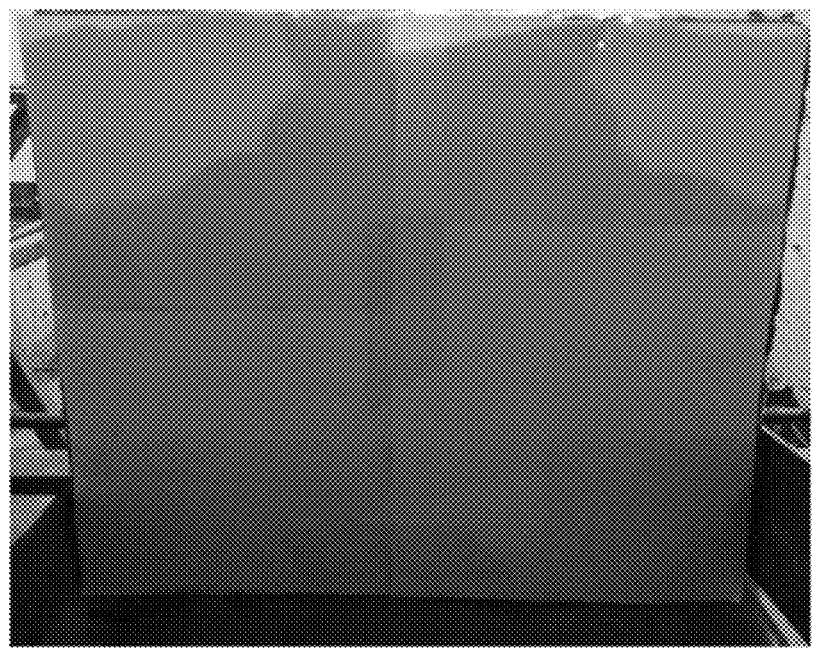
FIG. 3 shows the back side of a specimen post-ballistic impact.

FIG. 3 shows the full stoppage of the impact of the 12.7×99 mm perforating bullet (0.50 Cal.) projectile. By placing an observation screen which, on being intact, shows the lack of damage to the specimen.

Figure 4:
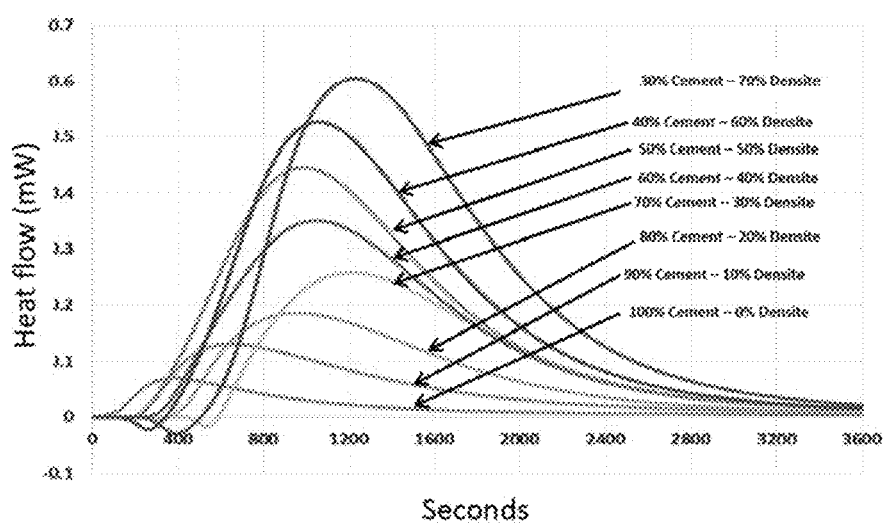
FIG. 4 shows a graph representing the increase in heat flow (reactivity) during the concrete hydrating process following the mechanical activation through high energy milling. mechanically activated with high-expansion pozzolana.

The graph in FIG. 4 shows curves of the heat flow against time, which represents the increase of heat flow (reactivity) during the concrete hydrating process following the mechanical activation through high energy milling. The increase of reactivity as a result of the incorporation of higher percentages of PCC material can be observed.

Figure 5:
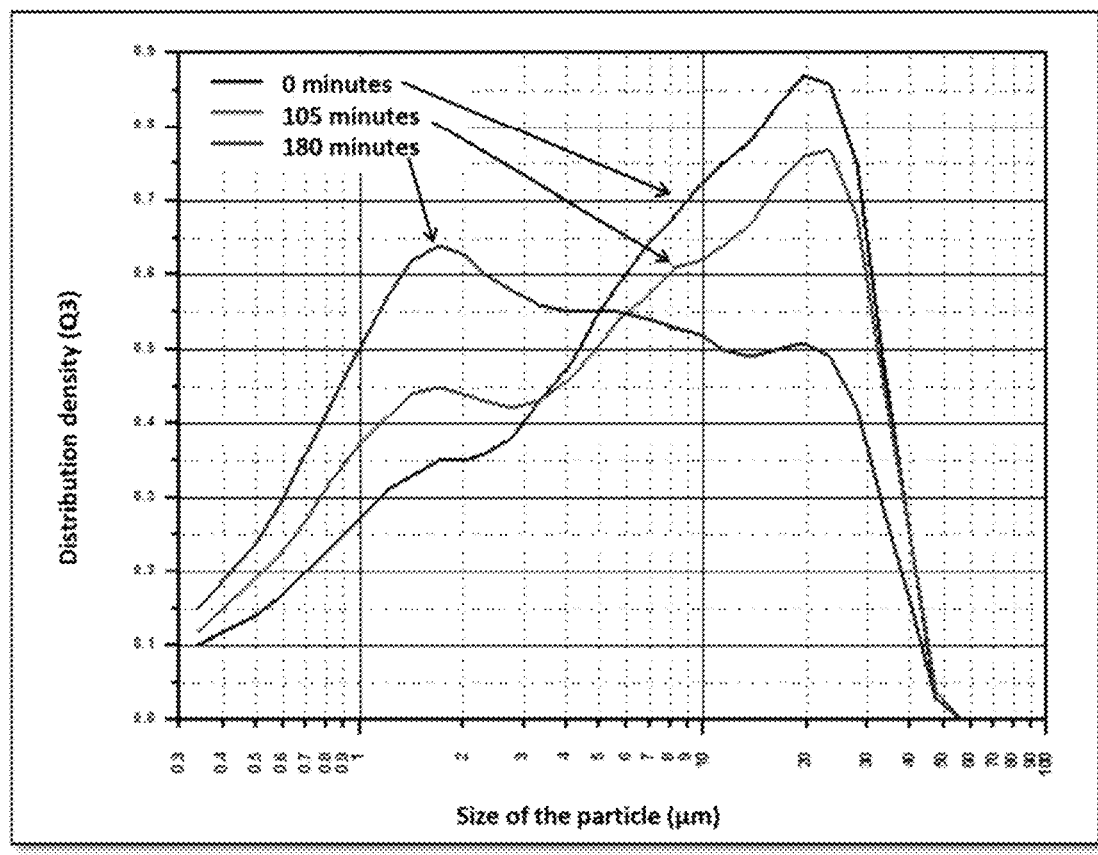
FIG. 5 shows a comparison between the different milling times.

The graph in FIG. 5 is a comparison between the different milling times and their effect on the distribution density of the powders that were subsequently hydrated. This evidence the change in the size of the particle used in the present invention.

More specifically, the present invention includes the designing of different mixes of Portland Composite Cement PCC, mechanically activated through high energy milling (HEM), with other ingredients, such as Ordinary PCC Cement, fine sand, fibers, and polymeric additives, among other components, to prepare composite high-performance walls capable of stopping various calibers up to type 50 (typically loaded in Barret rifles). In the development of the present invention, the focus was on establishing the optimization of the milling and/or mechanical activation (HEM) parameters of the ordinary cement, as well as in relation of the mechanically activated PCC mix/ordinary PCC, water/cement mix and cement/additives. Derived from the microstructural characterization carried out by X ray of the PCC subjected to mechanical activation (HEM up to 7 h), it was observed that as the cement particle size is refined and the surface area (Blaine) and chemical reactivity are increased in parallel, the amorphization trend of the PCC increases, simply upon contact with the air humidity. The chemical reactivity of the mechanically activated PCC cement is deduced from the isothermal analysis carried out, which reveals the corresponding hydration curves, as shown in FIG. 4.

In accordance with Mexican and US Standards for ballistic tests, which entail the approval of the concrete ballistic-resistant wall as long as it resists one impact with a 50 caliber Barret, it was possible to develop composite walls (with dimensions of 40×40×15 cm) with mechanically activated cement and performance complying with said standards.

The invention claimed is:

1. A method for manufacturing a mechanically activated cementitious composite for stopping an impact of firearm projectiles, which comprises the following steps:
   I. supplying Portland Composite Cement, wherein the Portland Composite Cement is mechanically activated through milling;
   II. adding pozzolana;
   III. adding water to create a mixture of Portland Composite Cement, pozzolana, and water;
   IV. placing the mixture in molds such that the mixture in the molds is 15 cm thick; and
   V annealing and curing the mixture in the molds for 28 days in a mixture of water with 1% calcium oxide per volume at a temperature of 27° C.

2. The method for manufacturing a mechanically activated cementitious composite for stopping the impact of firearm projectiles, in accordance with claim 1, characterized by the mechanically activated cementitious composite presenting a behavior of a non-Newtonian fluid during the step of the addition of water.

* * * * *